US011343433B2

(12) United States Patent
Goel et al.

(10) Patent No.: US 11,343,433 B2
(45) Date of Patent: May 24, 2022

(54) IMAGE PROCESSING APPARATUS HAVING OVERLAPPING SUB-REGIONS

(71) Applicant: TAIWAN SEMICONDUCTOR MANUFACTURING COMPANY, LTD., Hsinchu (TW)

(72) Inventors: Sandeep Kumar Goel, Dublin, CA (US); Yun-Han Lee, Baoshan Township (TW); Ashok Mehta, Los Gatos, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/595,088

(22) Filed: Oct. 7, 2019

(65) Prior Publication Data

US 2020/0036879 A1 Jan. 30, 2020

Related U.S. Application Data

(62) Division of application No. 14/458,815, filed on Aug. 13, 2014, now Pat. No. 10,440,281.

(51) Int. Cl.

| | |
|---|---|
| ***H04N 5/235*** | (2006.01) |
| ***H04N 5/217*** | (2011.01) |
| ***H04N 5/232*** | (2006.01) |
| ***H04N 5/243*** | (2006.01) |
| ***H04N 5/345*** | (2011.01) |

(52) U.S. Cl.

CPC .......... *H04N 5/2351* (2013.01); *H04N 5/217* (2013.01); *H04N 5/23229* (2013.01); *H04N 5/243* (2013.01); *H04N 5/345* (2013.01)

(58) Field of Classification Search

CPC .. H04N 5/2351; H04N 5/217; H04N 5/23229; H04N 5/345; H04N 5/243; H04N 9/09; H04N 9/097; H04N 9/093; H04N 5/3415; H04N 5/2258; H04N 5/23238; H04N 2209/048; H04N 2209/049; H04N 13/239; H04N 13/243; G02B 3/0056

USPC .................................................. 348/241–251

See application file for complete search history.

(56) References Cited

U.S. PATENT DOCUMENTS

2002/0122124 A1* 9/2002 Suda ................ H01L 27/14627 348/263

2004/0240052 A1* 12/2004 Minefuji ............. H04N 5/2254 359/435

(Continued)

*Primary Examiner* — Albert H Cutler

(74) *Attorney, Agent, or Firm* — Hauptman Ham, LLP

(57) ABSTRACT

An apparatus includes an image sensor having a light sensing region, the light sensing region being partitioned into a plurality of sub-regions, a first sub-region of the plurality of sub-regions has a first size, a second sub-region of the plurality of sub-regions has a second size different from the first size, and the second sub-region partially overlaps with the first sub-region. The apparatus further includes a processor coupled with the image sensor, wherein the processor includes a plurality of pixel processing units, and each processing unit of the plurality of processing units is configured to generate a processed image based on an image captured by a corresponding sub-region of the plurality of sub-regions. The apparatus further includes a plurality of lenses configured to focus incident light onto the image sensor.

20 Claims, 9 Drawing Sheets

400
LIGHT
103a
113a
103b
103d
103c
113c
p
q
Region 1
Region 3
Region 2
Region 4
401
113b
113d
107
Pixel Correction 1
Pixel Processing
Pixel Correction 2
Pixel Processing
Pixel Correction 3
Pixel Processing
Pixel Correction 4
Pixel Processing
DSP
Combined/individual image/video processing
Store image/video in memory
ASIC/SOC

(56) References Cited

U.S. PATENT DOCUMENTS

2005/0128509 A1* 6/2005 Tokkonen .............. H04N 9/045 358/1.15
2005/0134712 A1* 6/2005 Gruhlke ................. H04N 9/045 348/272
2007/0257184 A1* 11/2007 Olsen ................... H04N 5/2253 250/208.1
2008/0029714 A1* 2/2008 Olsen ..................... G03B 13/18 250/475.2
2008/0278610 A1* 11/2008 Boettiger ............. H04N 5/2253 348/273
2009/0160997 A1* 6/2009 Oyama .................. H04N 9/045 348/340
2009/0174765 A1* 7/2009 Namba .................... G02B 3/14 348/46
2010/0079625 A1 4/2010 Miwa
2010/0097443 A1* 4/2010 Lablans ........... H04N 5/232945 348/36
2010/0097491 A1 4/2010 Farina et al.
2012/0133807 A1 5/2012 Wu et al.
2012/0314106 A1 12/2012 Kanemitsu et al.
2013/0027575 A1 1/2013 Cho et al.
2013/0221470 A1 8/2013 Kinsman et al.
2014/0077063 A1 3/2014 Cho
2014/0125810 A1* 5/2014 D'Amico ........... H04N 9/04553 348/164
2014/0160231 A1* 6/2014 Middleton ......... H04N 5/23238 348/36
2014/0320715 A1* 10/2014 Haji-Khamneh ........................... H04N 5/23229 348/302
2015/0288894 A1 10/2015 Geelen et al.

* cited by examiner

IMAGE PROCESSING APPARATUS HAVING OVERLAPPING SUB-REGIONS

PRIORITY CLAIM

This application is a divisional of U.S. application Ser. No. 14/458,815, filed Aug. 13, 2014, which is incorporated herein by reference in its entirety.

RELATED APPLICATIONS

This application is related to U.S. patent application Ser. No. 14/458,873, filed Aug. 13, 2014, now U.S. Pat. No. 9,391,110, issued Jul. 12, 2016, which is incorporated by reference herein in its entirety.

This application is related to U.S. patent application Ser. No. 15/194,961, filed Jun. 28, 2016, now U.S. Pat. No. 9,647,028, issued May 9, 2017, which is incorporated by reference herein in its entirety.

BACKGROUND

Device manufacturers are challenged to develop integrated circuits that provide increased processing speeds and capabilities while meeting the demand to reduce device size and increase device manufacturing throughput. Some imaging devices, such as cameras, that take three-dimensional (3D) images process images captured by the imaging device using processing equipment that is separate from the imaging device. Some imaging devices such as cameras that take 3D images are large, because of the quantity of components housed within the imaging device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
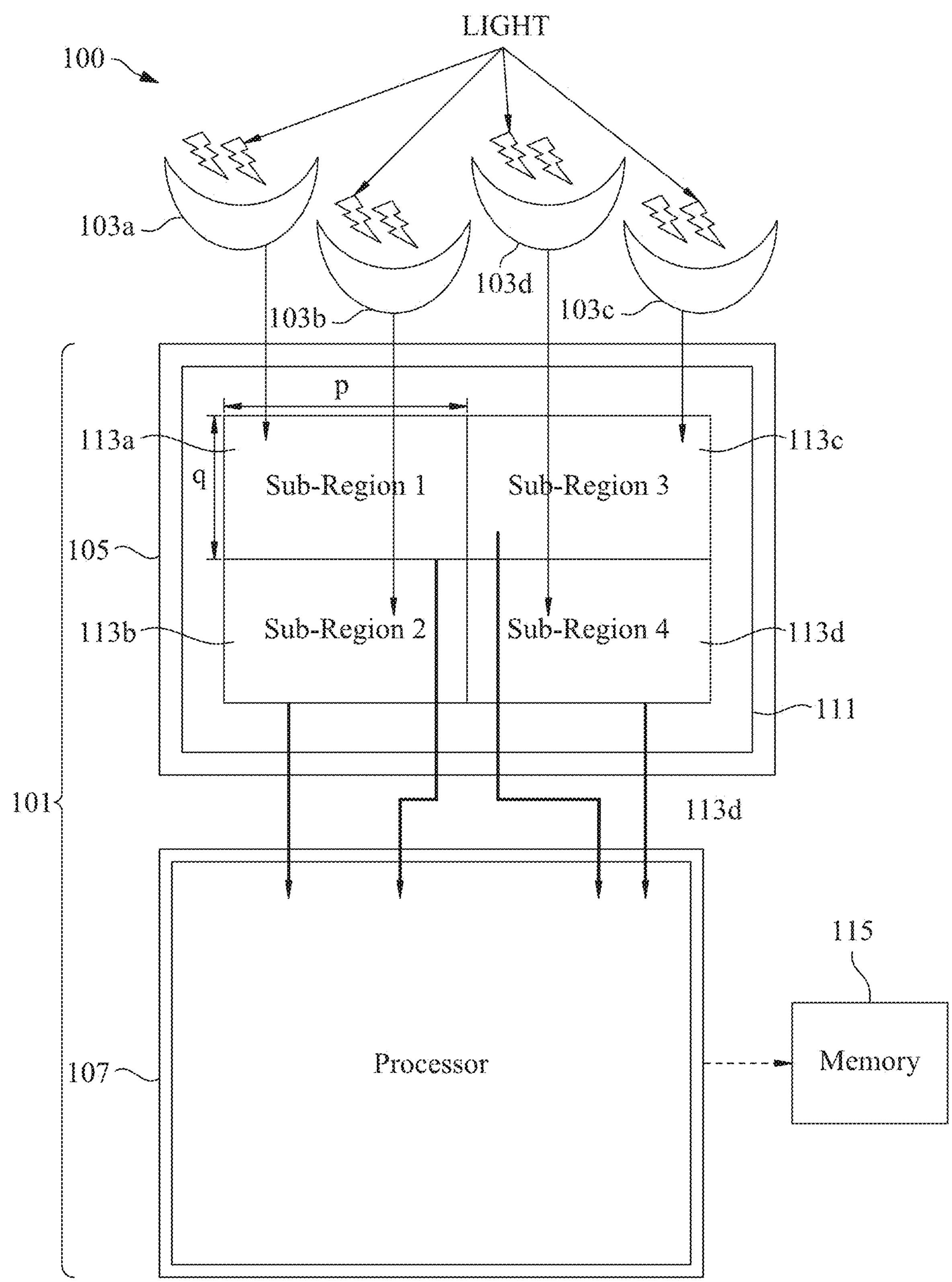
FIG. 1 is a functional block diagram of an imaging device, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some imaging devices, such as cameras, that take 3D images use additional equipment such as a separate computer to process and output an image taken by the imaging device. Such imaging devices are incapable of providing contemporaneous gratification of enhanced 3D images directly on the imaging device after an image is captured, because most post-processing of the captured image is performed off of the imaging device by the separate computer. Some imaging devices are single lens systems. Other imaging devices are multiple lens systems.

Some multiple lens systems are configured having a quantity of image sensors such as complementary-metal-oxide-semiconductor (CMOS) image sensors that are respectively coupled to an equivalent quantity of processors (e.g., application specific integrated circuits or systems on chips). These processors are configured to individually process an image captured by a corresponding image sensor. But, such imaging devices are often large, because of the quantity of components, or slow, because of the quantity and length of the connections between the image sensors and the respective processors. These imaging devices are sometimes prone to error, also because of the quantity and length of the connections between the image sensors and the respective processor, as well as the quantity of components.

Embodiments of an imaging device 100 capable of on-device image processing and having a smaller overall size compared to typical imaging devices are discussed below. The embodiments discussed include an integrated circuit that has an image sensor with a light sensing region partitioned into two or more sub-regions. The image sensor is coupled with a processor. By partitioning the light sensing region of the image sensor into k sub-regions (where k is greater than 1), while coupling the image sensor with a processor that processes images captured by the k sub-regions, a chip size of the integrated circuit is capable of being reduced by a factor of k compared to typical imaging devices that have k image sensors and k processors. Partitioning the light sensing region of an image sensor makes it possible receive light and capture images using a quantity of sub-regions that is greater than a quantity of corresponding processors. In some embodiments, the discussed processor is a single processor.

FIG. 1 is a functional block diagram of imaging device 100, in accordance with one or more embodiments. Imaging device 100 comprises an integrated circuit 101 configured to receive and process images captured based on light received through lenses 103*a*-103*d* (collectively referred to as lens 103). The integrated circuit 101 comprises an image sensor 105 communicatively coupled with a processor 107. In some embodiments, the image sensor 105 is a CMOS image sensor.

The image sensor 105 is over the processor 107. In some embodiments, the image sensor 105 and the processor 107 have equal-sized surface areas in parallel two-dimensional planes. For example, if the image sensor 105 and the processor 107 are square or rectangular, the image sensor 105 and the processor 107 have equal lengths and widths such that the surface area of the image sensor 105 is equal to the surface area of the processor 107. If the image sensor 105 and the processor 107 are circular, the image sensor 106 and the processor 108 have equal diameters such that the surface area of the image sensor 105 is equal to the surface area of the processor 107. Or if the image sensor 105 and the processor 107 are a different shape such as an ellipse, a trapezoid, a triangle, a parallelogram, or other suitable shape, the image sensor 105 and the processor 107 would have equal dimensions so at least such that the surface area of the image sensor 105 is equal to the surface area of the processor 107.

In some embodiments, the image sensor 105 is fused or bonded to the processor 107. In other embodiments, the image sensor 105 is fastened to be in contact with, or fastened into a position over, the processor 107. In some embodiments, the image sensor 105 is formed over a first substrate (not shown), flipped, and fused to, bonded to, or fastened to, the processor 107 which is formed over a second substrate (not shown) in a wafer-on-wafer process such that the image sensor 105 is in direct contact with the processor 107.

The image sensor 105 has a light sensing region 111. The light sensing region 111 is partitioned into sub-regions 113*a*-113*d* (collectively referred to as sub-region 113) having equal sized light sensing surface areas. The image sensing region 111 is partitioned into the sub-regions 113 by one or more of scribe lines in the image sensor 105, a boundary defined by computer-readable instructions executed by the processor 107, a boundary line printed over the image sensing region 111 to block or absorb light, a space between the sub-regions 113 configured to absorb light, or another suitable manner by which the light sensing region 111 is partitioned to separate the sub-regions.

In some embodiments, the sub-regions 113 are individual image sensor dies that in combination form the light sensing region 111. The light sensing region 111 is thereby partitioned into the sub-regions 113 based on a boundary between the sensor dies. In some embodiments the light sensing region 111 is partitioned into at least two sub-regions 113. In other embodiments, the light sensing region 111 is partitioned into k sub-regions such as a quantity of sub-regions 113 greater than the discussed four sub-regions 113.

In some embodiments, at least one sub-region 113 has a different sized light sensing surface area compared to the other sub-regions 113. The sub-regions 113 are coupled with the processor 107. In some embodiments, the sub-regions 113 are coupled with the processor 107 by one or more of one or more vias, one or more electrically conductive lines, a bus, or one or more other suitable connective features. In some embodiments, the sub-regions 113 are individually coupled with the processor 107. In some embodiments, the sub-regions 113 are directly coupled with the processor 107.

In some embodiments, the surface area of the image sensor 105 is made equal to the surface area of the processor 107 by including one or more sub-regions 113 that are dummy sub-regions. In some embodiments, dummy sub-regions are sub-regions 113 that are electrically isolated from the processor 107. Making the surface area of the image sensor 105 and the processor 107 equal makes manufacturing of the integrated circuit 101 by way of a wafer-on-wafer process possible.

Light passes through the lenses 103 and is received by the image sensor 105 via the light sensing region 111. The lenses 103 are configured to focus light onto the light sensing region 111, and accordingly, the sub-regions 113. Sub-regions 113 capture images based on the light received by the image sensor 105 via the light sensing region 111.

The lenses 103 are associated with corresponding sub-regions 113. For example, a lens 103*a* is associated with the sub-region 113*a*, and the image captured by sub-region 113*a* is based on the light received by sub-region 113*a* through lens 103*a*. The lenses 103 are in positions that are generally orthogonal over the sub regions 113 with respect to a surface of the image sensor 105. In some embodiments, at least one of the lenses 103 is oriented at an angle that is different from the other lenses with respect to the surface of the image sensor 105. A lens 103 is positioned in a particular orientation, for example, to maximize an amount of light received by a corresponding sub-region 113, or to reduce or eliminate a light reception issue that introduces noise to a captured image.

The lenses 103 are in fixed positions over the sub-regions 113. In some embodiments, at least one of the lenses 103 is selectively movable. In some embodiments, a single lens 103, that is either fixed or movable, replaces lenses 103*a*-103*d*. If moveable, the lenses 103 are movable or rotatable in one or more directions such as horizontal and/or vertical with respect to a surface of the image sensor 105. In some embodiments, processor 107 is coupled with a drive mechanism such as a motor, stepper motor, servo motor, or other device capable of moving or rotating a lens to selectively alter a position of the at least one movable lens based on an instruction received from the processor 107.

In some embodiments, lenses 103 comprise a quantity of lenses greater than the four example lenses 103*a*-103*d*. In some embodiments, lenses 103 comprise two to four lenses. In some embodiments, a quantity of sub-regions 113 is equal to a quantity of lenses 103. In other embodiments, the quantity of sub-regions 113 is greater than or less than the quantity of lenses 103. In some embodiments, the quantity of lenses 103 is selectable in order to maximize the amount of light received by the sub-regions 113 while meeting a design constraint that limits device size or cost.

The lenses 103 are equal in size measureable by one or more of area, aperture, focal length, or other dimension. In some embodiments, the lenses 103 are different sizes to maximize an amount of light received by the sub-regions 113. In some embodiments, if at least one of the sub-regions 113 has a light sensing surface area size that is different compared to the other sub-regions 113, the lens 103 that corresponds to the sub-region 113 having the different sized light sensing surface area has a lens size that corresponds to the size of the light sensing surface area of the sub-region 113 having the different sized light sensing surface area compared to the other sub-regions 113.

The processor 107 is configured to identify images captured by each sub-region 113. The processor 107 individually processes the captured images to compensate for light reception issues that introduce noise to the captured image such as shadowing effects, interfering light, hot and cold spots on the sub-regions 113, or other lighting issues that are capable of being compensated for and corrected. The processor 107, accordingly, generates processed images that are modified by a pixel correction process. In some embodiments, the pixel correction process is a computer-readable instruction executed by the processor 107. The pixel correction process compensates for at least one predefined light reception factor individually associated with each of the sub-regions 113. Pre-defined light reception factors are, for example, values or equations that are representative of a degree of a light reception issue that affects the image captured by a sub-region 113. For example, if a portion of a sub-region 113 is known to have a light reception issue such as a shadowing or light interference issue, a light reception factor is assigned to the portion of the sub-region 113 that has the light reception issue, and the processor 107 modifies the received image to correct the light reception issue based on the predefined light reception factor.

The processor 107 is further configured to combine the processed images to generate a final corrected image. In some embodiments, the processor 107 is configured to cause at least the final corrected image to be stored in a memory 115 that is coupled with the processor 107 by way of a wired or wireless connection. In some embodiments, memory 115 is embodied with the processor 107 on a same substrate or chip. In some embodiments, memory 115 is included within the processor 107.

In some embodiments, two or more of the sub-regions 113 overlap. For example, two or more sub-regions 113 overlap if a sub-region 113 receives light from a non-corresponding lens 103, a portion of two adjacent sub-regions 113 receive light from a same lens 103 if there is more than one lens 103, the type of partitioning of the image sensing region 111 causes light reception issues, the quantity or positioning of the lenses 103 causes light reception issues between the sub-regions 113, or because a portion of a sub-region 113 within a predetermined distance of an adjacent sub-region 113 has a likelihood of having light reception issues, and is considered to be overlapping with the adjacent sub-region 113.

The processor 107, in some embodiments, is configured to discard one or more portions of the images captured by way of the sub-regions 113 that are based on light received within the overlapped areas as a part of the pixel correction process. Alternatively, the processor 107 is optionally configured to tune the predefined light reception factor associated with the two or more sub-regions based on the light received within the overlapped areas as a part of the pixel correction process.

Figure 2:
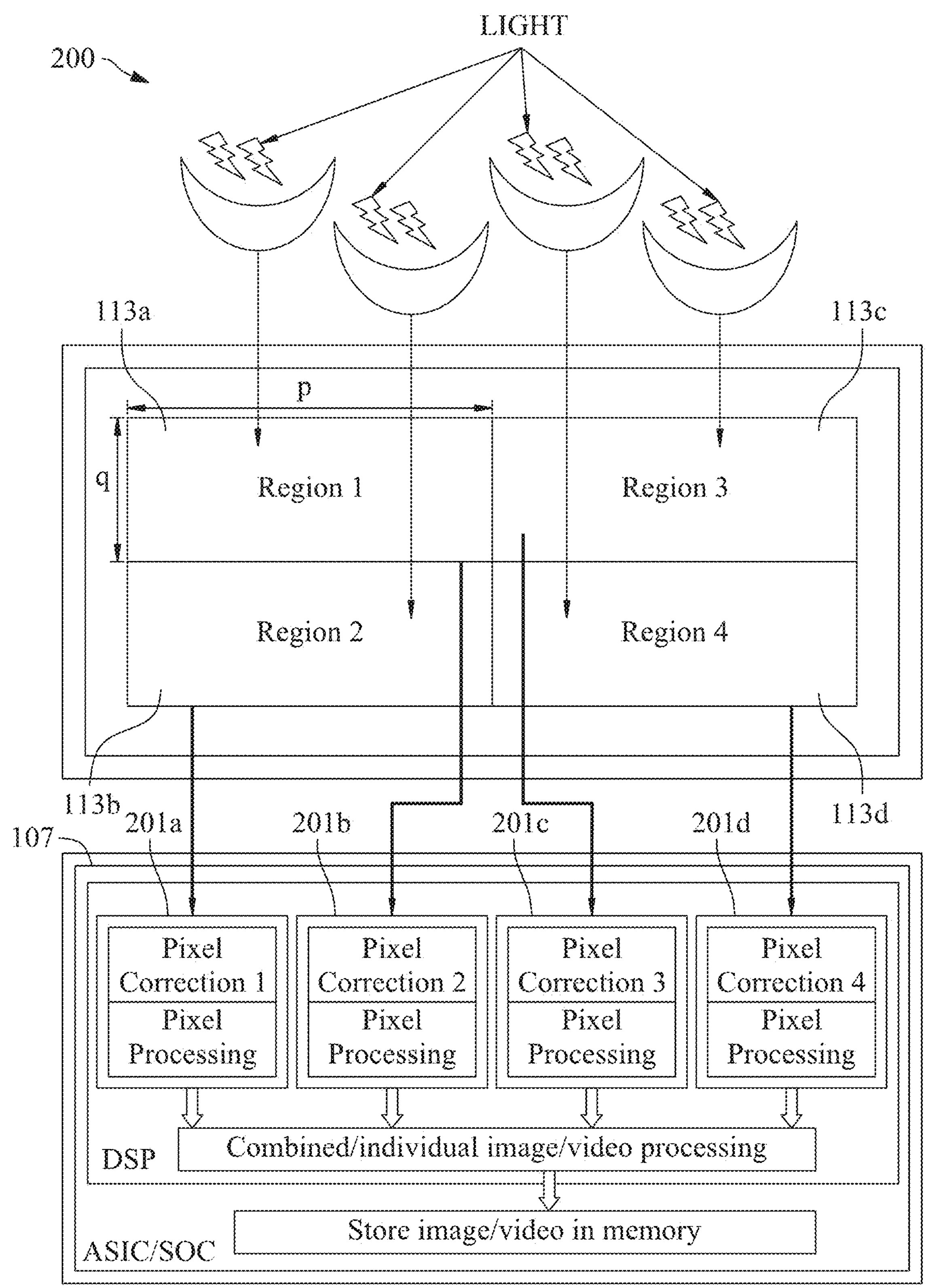
FIG. 2 is a functional block diagram of an imaging device, in accordance with one or more embodiments.

FIG. 2 is a functional block diagram of an imaging device 200, in accordance with one or more embodiments. Imaging device 200 includes many of the features included in imaging device 100 (FIG. 1).

Processor 107 includes pixel processing units 201*a*-201*d* (collectively referred to as pixel processing unit 201) that correspond to respective sub-regions 113*a*-113*d*, and a processed image combination module 203 coupled with the pixel processing units 201. The pixel processing units 201 each comprise a pixel correction module 205 and a pixel processing module 207. The pixel correction module 205 executes the pixel correction process to generate a corrected image. The pixel processing module 207 processes the corrected image to generate a processed image that is ready to be combined with other processed images by the combination module 203 to generate a final corrected image. In some embodiments, the pixel processing units 201*a*-201*d* are configured to individually process and correct the images captured by the corresponding sub-regions 113*a*-113*d*. In some embodiments, the processor 107 comprises a quantity of pixel processing units 201 that equals a quantity of sub-regions 113. In some embodiments, the processor 107 includes a lesser quantity of pixel processing units 201. In some embodiments, the pixel processing units 201 and the combination module 203 are a digital signal processor in combination.

The sub-regions 113 are coupled with the pixel processing units 201 by one or more of one or more vias, one or more electrically conductive lines, a bus, or one or more other suitable connective features. In some embodiments, the sub-regions 113 are individually directly coupled with the pixel processing unit 201 that corresponds with the connected sub-region 113. The pixel processing units 201*a*-201*d* are individually directly coupled with the corresponding sub-regions 113*a*-113*d*.

Figure 3:
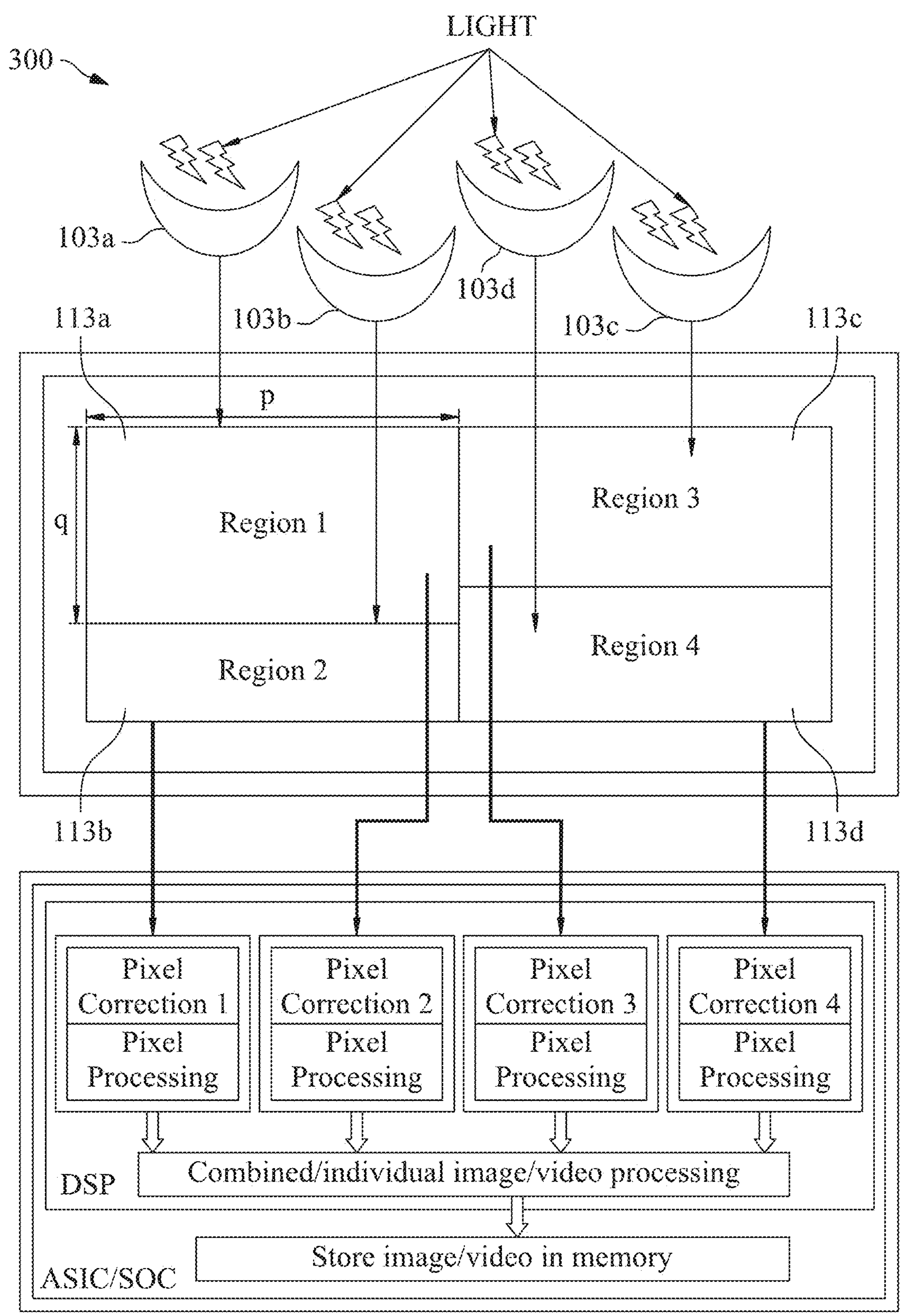
FIG. 3 is a functional block diagram of an imaging device, in accordance with one or more embodiments.

FIG. 3 is a functional block diagram of an imaging device 300, in accordance with one or more embodiments. Imaging device 300 includes many of the features included in imaging device 100 (FIG. 1). The sub-regions 113 included in the imaging device 300 have different sized light sensing areas to maximize an amount of light received by one sub-region 113 compared to another sub-region 113. The sub-regions 113 in imaging device 300 do not overlap. The lenses 103 are equal in size, which is measureable by one or more of area, aperture, focal length, or other dimension, in this example.

Figure 4:
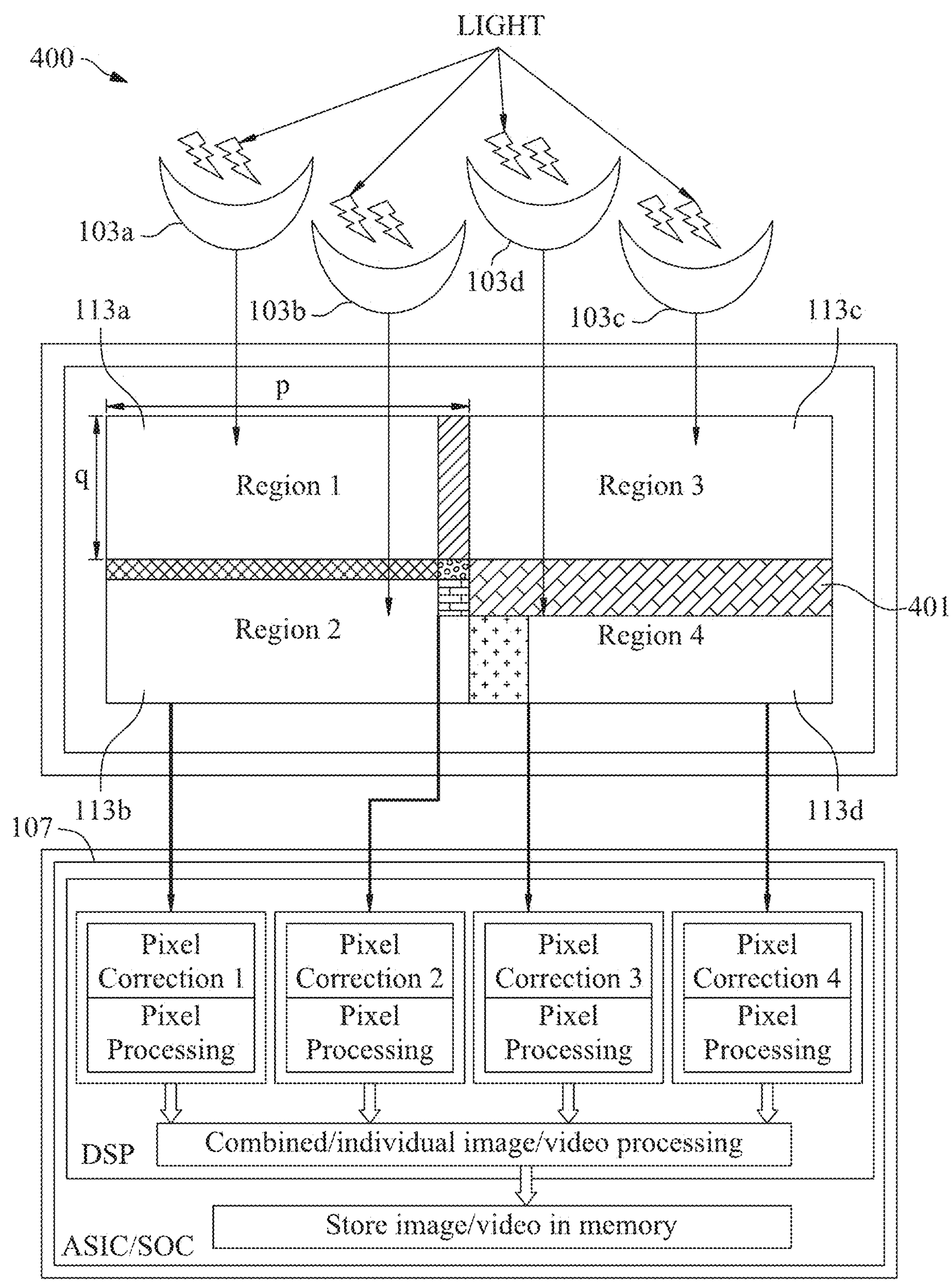
FIG. 4 is a functional block diagram of an imaging device, in accordance with one or more embodiments.

FIG. 4 is a functional block diagram of an imaging device 400, in accordance with one or more embodiments. Imaging device 400 includes many of the features included in imaging device 100 (FIG. 1). The sub-regions 113 included in the imaging device 400 have different sized light sensing surface areas and overlap in portions of the sub-regions 113 that are predefined as having light reception issues such as light interference, or other light reception issues that introduce noise to a captured image, as discussed above. The lenses 103 are equal in size, which is measureable by one or more of area, aperture, focal length, or other dimension, in this example.

The processor 107 takes the overlapped portions 401 into account when processing and correcting the images captured by the sub-regions 113 such as by assigning a light reception factor that is based an amount of the light sensing surface area of a sub-regions 113 that is occupied by an overlapped portion 401. In some embodiments, the processor 107 wholly discards portions of the images captured by the sub-regions 113 that correspond to the light received within the overlapped portion 401 when processing and correcting the images captured by the sub-regions 113. Accounting for the overlapped regions or discarding the portions of the images captured by the sub-regions 113 based on light received within the overlapped portions 401 reduces or eliminates noise introduced to the images captured by the sub-regions 113 that is caused by light interference or other light reception issues. It should be noted that, in some embodiments, sub-regions 113 having equal sized light sensing surface areas that have overlapped portions 401.

In some embodiments, the processor 107 is configured to minimize the area of the overlapped portions 401 by determining images captured by light received within one or more sub-portions of the overlapped portions 401 are tainted by noise that is within a predetermined threshold value. If the images captured within the overlapped portions 401 are within the predetermined threshold value, the processor 107 optionally includes this image data when processing and correcting the images captured by sub-regions 113 to minimize an amount of image data that would otherwise be lost if the images captured within the overlapped portions 401 were wholly discarded.

Figure 5:
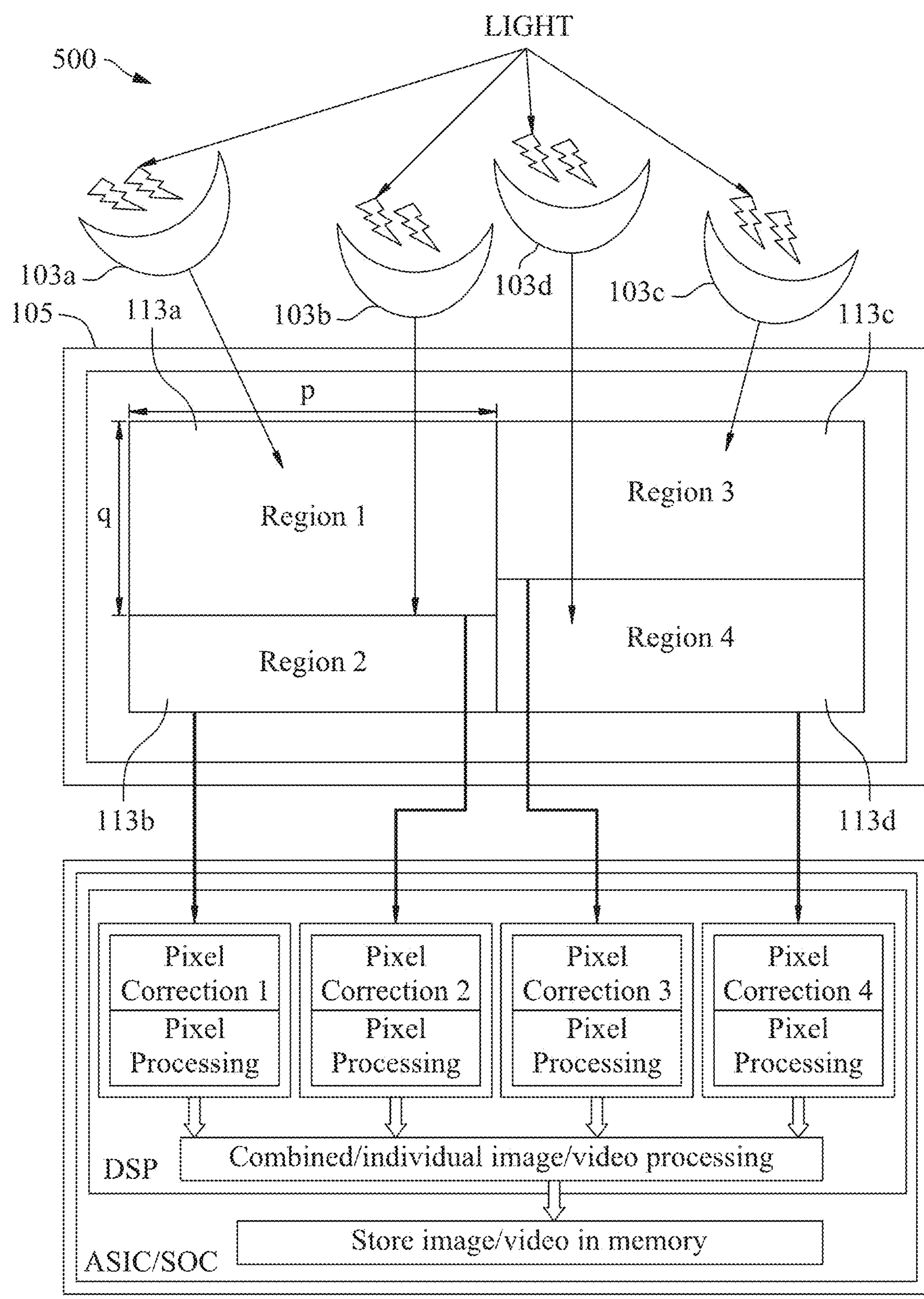
FIG. 5 is a functional block diagram of an imaging device, in accordance with one or more embodiments.

FIG. 5 is a functional block diagram of an imaging device 500, in accordance with one or more embodiments. Imaging device 500 includes many of the features included in imaging device 100 (FIG. 1). Imaging device 500 includes lenses 103 that have different angle orientations with respect to a surface of the image sensor 105. For example, lenses 103*b* and 103*d* in the imaging device 500 are arranged in a position such that the lenses 103*b* and 103*d* are substantially orthogonal with respect to a surface of the image sensor 105. Lenses 103*a* and 103*c* are arranged in a position such that the lenses 103*a* and 103*c* are at an angle that is other than an angle that is substantially orthogonal with respect to the surface of the image sensor 105. The lenses 103 are arranged in orthogonal or angled positions to maximize an amount of light received by a corresponding sub-region 113. In some embodiments, the lenses 103 are arranged at an angle with respect to the surface of the image sensor 105 that ranges from about 0 degrees to about 180 degrees.

Figure 6:
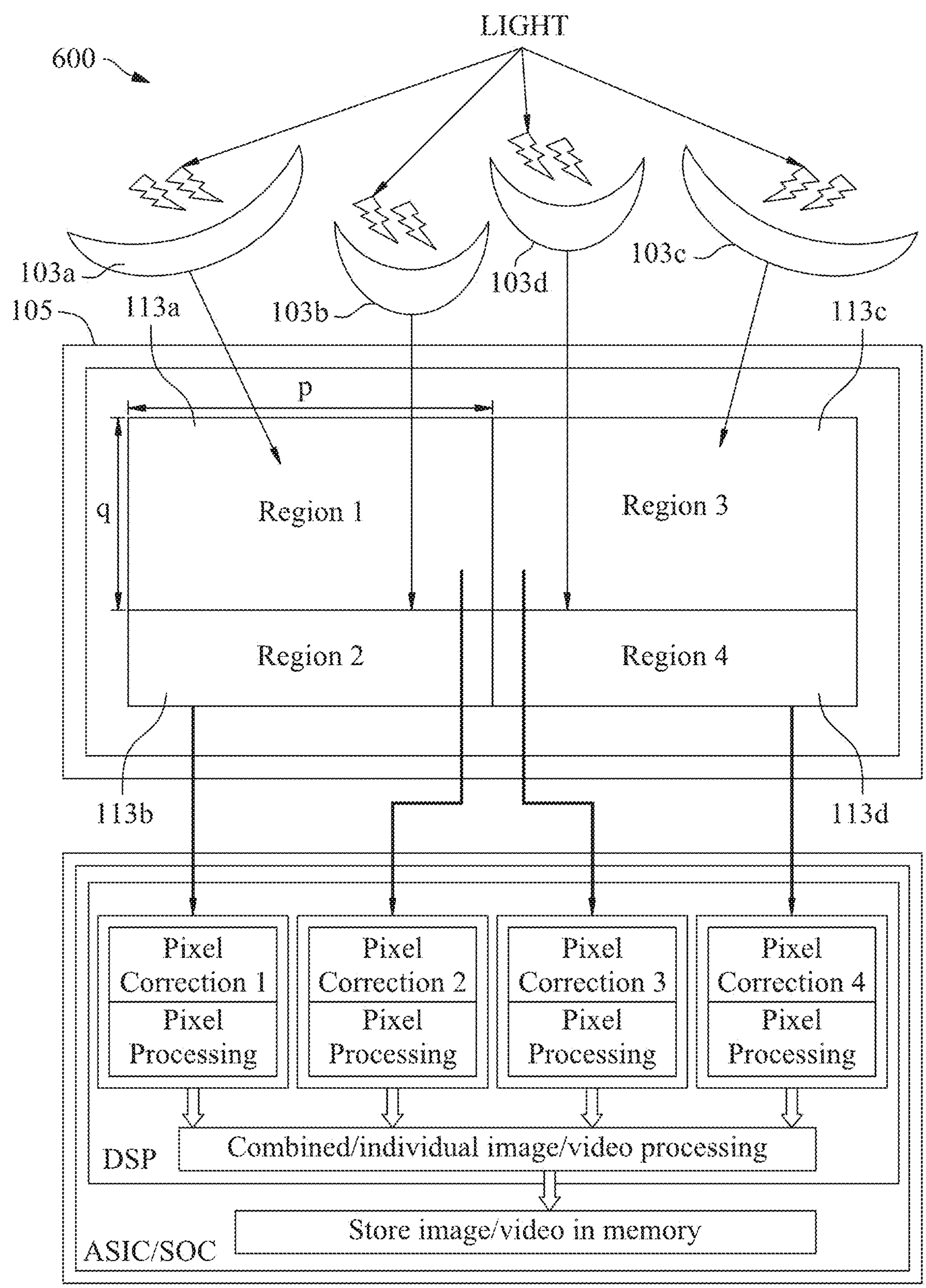
FIG. 6 is a functional block diagram of an imaging device, in accordance with one or more embodiments.

FIG. 6 is a functional block diagram of an imaging device 600, in accordance with one or more embodiments. Imaging device 600 includes many of the features included in imaging device 100 (FIG. 1). The sub-regions 113 included in the imaging device 600 have different sized light sensing surface areas. Imaging device 600 includes lenses 103 that have different sizes, which are measureable by one or more of area, aperture, focal length, or other dimension. For example, lenses 103*b* and 103*d* in the imaging device 600 are smaller in surface area than lenses 103*a* and 103*c*. In imaging device 600, the size of the lenses 103 is based on the light sensing surface area size of the sub-region 113 with which the lens 103 corresponds. As such, sub-regions 113*a* and 113*c*, which have light sensing surface areas that are larger than sub-regions 113*b* and 113*d*, have corresponding lenses 103*a* and 103*c* that are larger in surface area than lenses 103*b* and 103*d* to maximize an amount of light received by the sub-regions 113.

Figure 7:
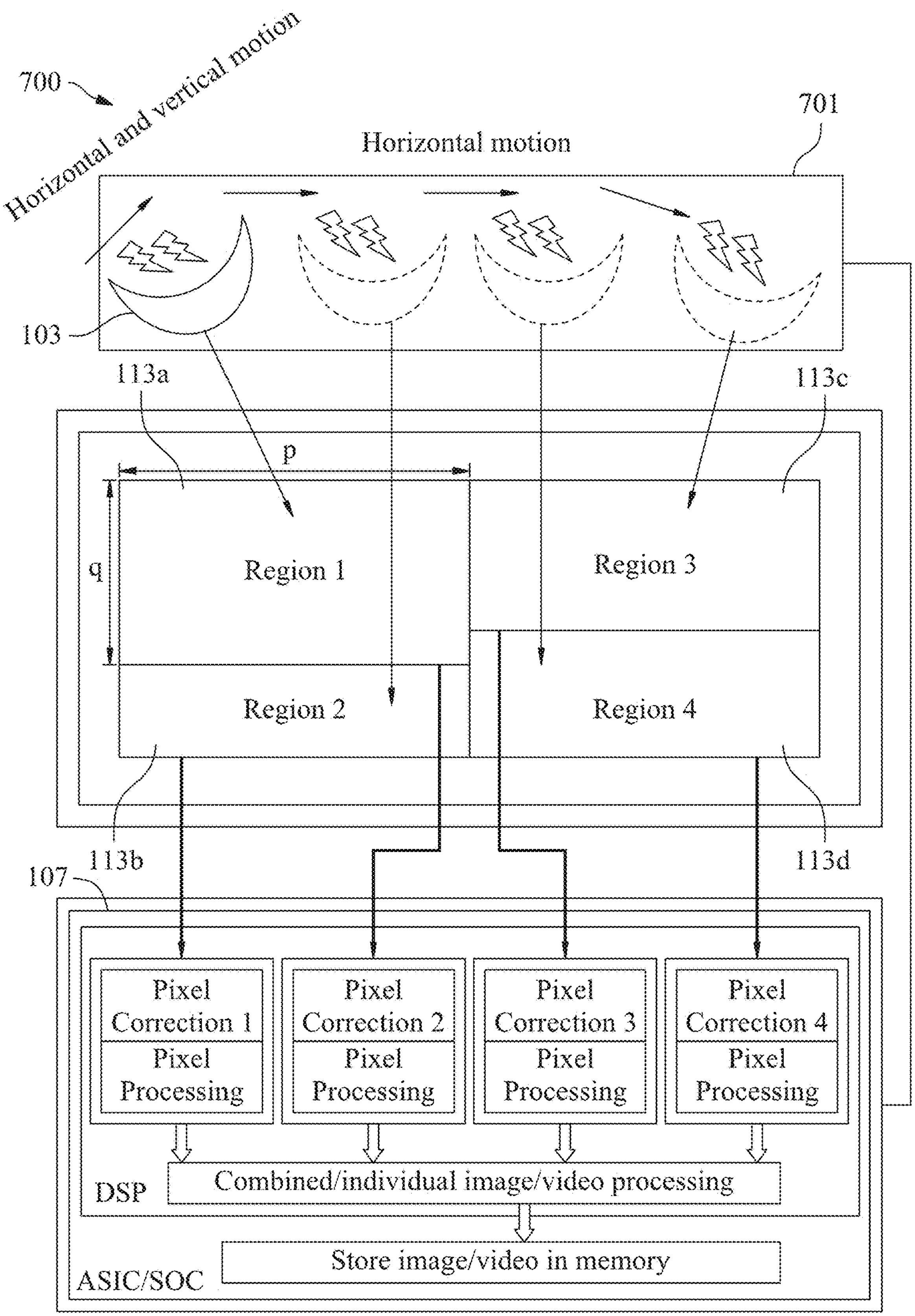
FIG. 7 is a functional block diagram of an imaging device, in accordance with one or more embodiments.

FIG. 7 is a functional block diagram of an imaging device 700, in accordance with one or more embodiments. Imaging device 700 includes many of the features included in imaging device 100 (FIG. 1), and a drive mechanism 701 coupled with the processor 107. The drive mechanism 701 is, for example, a motor, a stepper motor, a servo motor, or other suitable mechanism configured to change a position of a lens within or attached to an imaging device.

Imaging device 700 includes a single lens 103 that is one or more of movable or rotatable in one or more directions. The processor 107 selectively causes the drive mechanism 701 to move the lens 103 over a selected sub-region 113 to cause light to be received by the selected sub-region 113 through the lens 103. The processor 107, accordingly, processes and corrects images that are captured by the sub-regions 113 at times when the lens 103 is in a predetermined image capture position to maximize an amount of light received by the sub-regions 113, and to minimize noise created by the discussed light reception issues, for example.

In embodiments of the imaging device that include multiple lenses 103, the drive mechanism 701 is caused by the processor 107 to move the lenses 103 individually or as a group to maximize an amount of light received by the sub-regions 113, and to minimize noise created by the discussed light reception issues, for example.

The speed at which the processor 107 directs the drive mechanism 701 to move the lens 103 is dependent on a quantity of the sub-regions 113 and a quantity of lenses 103. In at least one embodiment, if there are n sub-regions 113, and one lens 103, then the processor 107 causes the drive mechanism 701 to move the one lens 103 at a speed that is n-times faster than if the imaging device included a quantity of multiple movable lenses 103 that is equal to a quantity of sub-regions 113.

Figure 8:
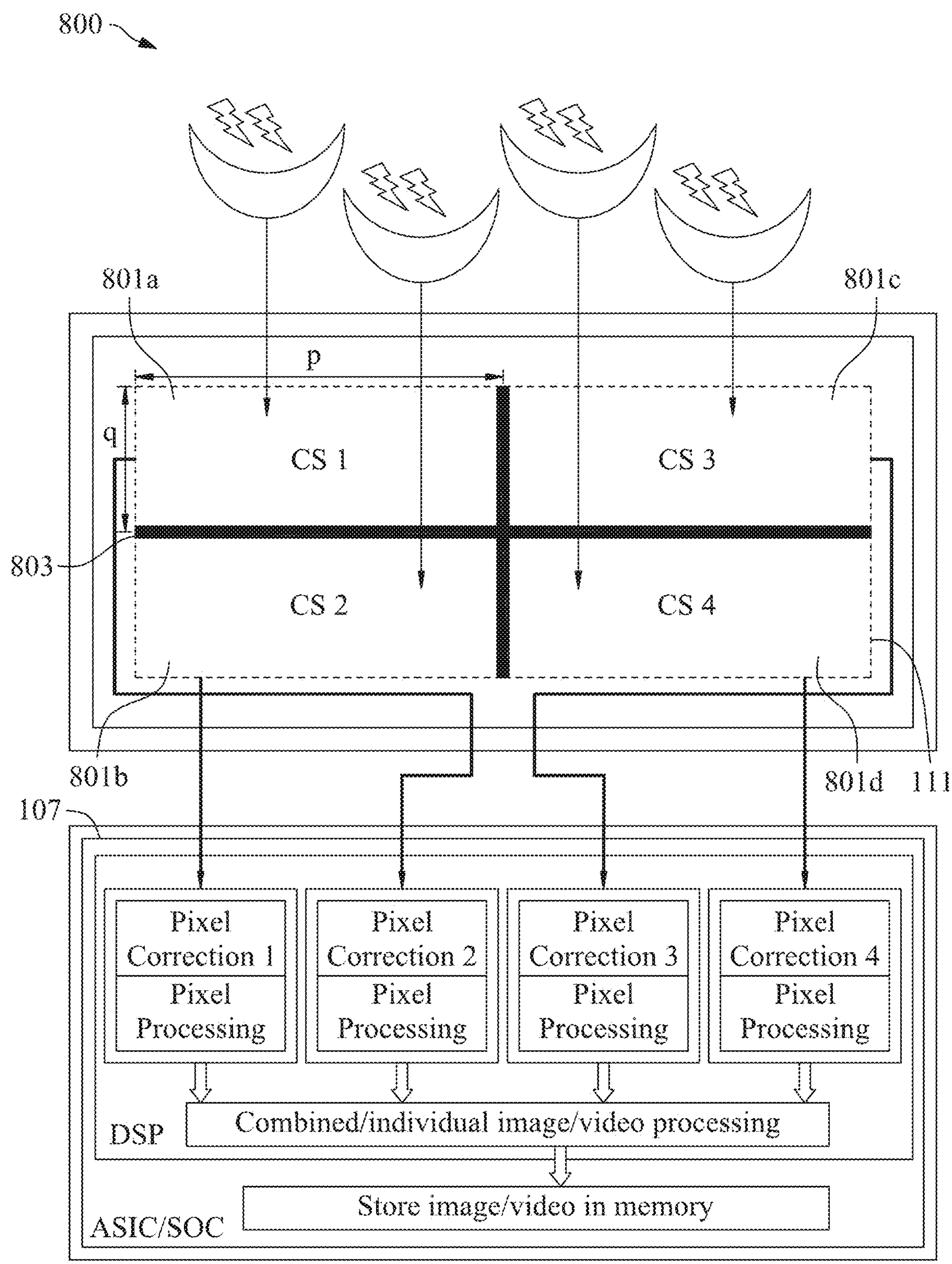
FIG. 8 is a functional block diagram of an imaging device, in accordance with one or more embodiments.

FIG. 8 is a functional block diagram of an imaging device 800, in accordance with one or more embodiments. Imaging device 800 includes many of the features included in imaging device 100 (FIG. 1). Imaging device 800 includes an image sensing region 111 made up of individual image sensor dies 801*a*-801*d* (collectively referred to as image sensor dies 801) that partition the image sensing region 111 into sub-regions 113 (FIG. 1). The image sensor dies 801 are configured to capture images which are processed by the processor 107 in the same manner as images that are received by sub-regions 113 (FIG. 1). The individual image sensor dies 801 are separated by a dark field boundary 803 configured to absorb light in areas between the image sensor dies 801 to minimize the light reception issues such as light interference between the image sensor dies 801. Dark field boundary 803 is, for example, a space between the image sensor dies 801, a structure that comprises a dielectric material between and/or over the image sensor dies 801, or a printed line over one or more portions of one or more light sensing surfaces of the image sensor dies 801.

Figure 9:
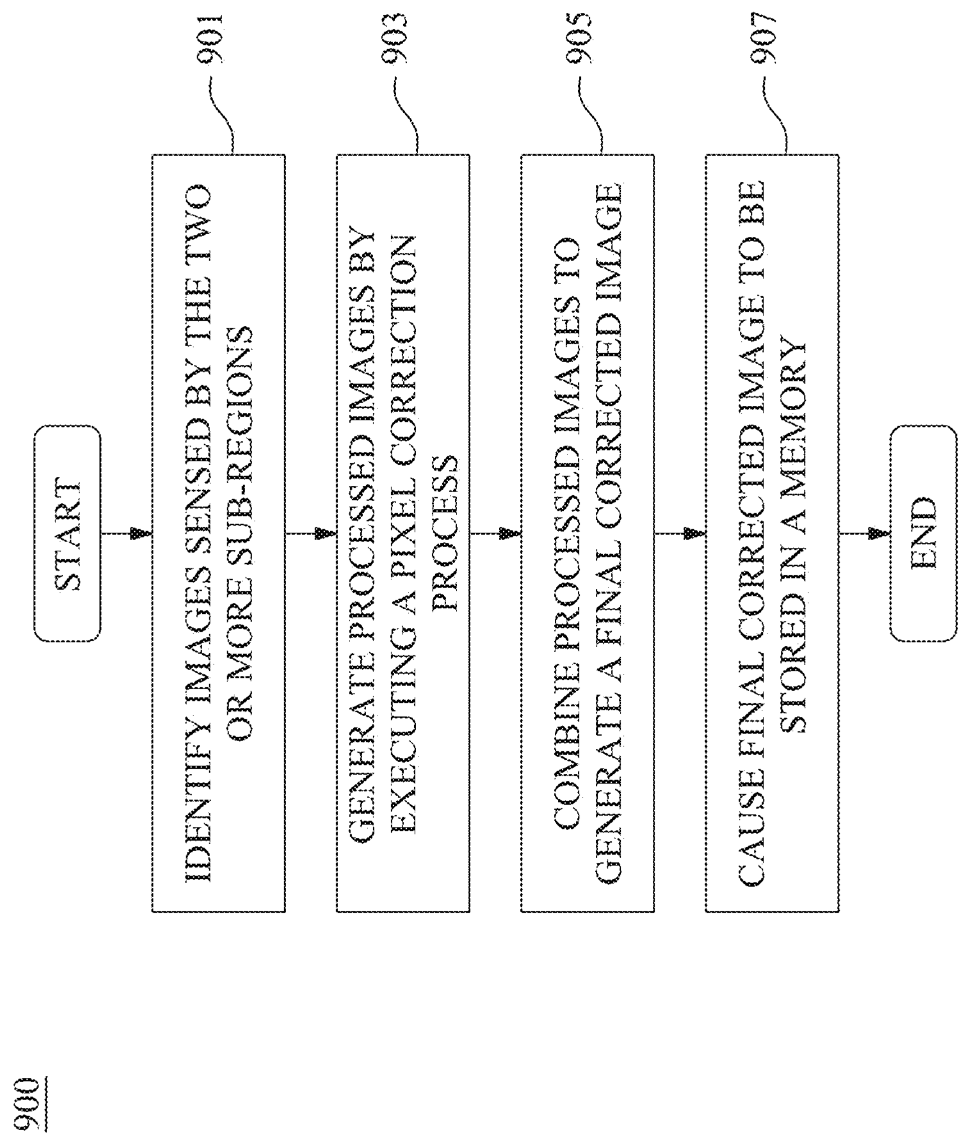
FIG. 9 is a flowchart of a method of processing light received by an image sensor, in accordance with one or more embodiments.

FIG. 9 is a flowchart of a method 900 of processing light received by an image sensor such as image sensor 105 (FIG. 1), in accordance with one or more embodiments.

In step 901, a processor, such as processor 107 (FIG. 1), coupled with the image sensor identifies a first image and another image captured by two or more sub-regions such as sub-regions 113 (FIG. 1) of a light sensing region such as light sensing region 111 (FIG. 1) of the image sensor.

In step 903, the processor generates a first processed image and a second processed image. The first processed image and the second processed image are generated based on a pixel correction process executed by the processor. The pixel correction process corrects one or more of the image or the another image based on a predefined light reception factor associated with the two or more sub-regions.

In step 905, the processor combines the first processed image and the second processed image to generate a final corrected image.

In step 907, the processor causes the final corrected image to be stored in a memory such as memory 115 (FIG. 1).

An aspect of this description relates to an apparatus. The apparatus includes an image sensor having a light sensing region, the light sensing region being partitioned into a plurality of sub-regions, a first sub-region of the plurality of sub-regions has a first size, a second sub-region of the plurality of sub-regions has a second size different from the first size, and the second sub-region partially overlaps with the first sub-region. The apparatus further includes a processor coupled with the image sensor, wherein the processor includes a plurality of pixel processing units, and each processing unit of the plurality of processing units is configured to generate a processed image based on an image captured by a corresponding sub-region of the plurality of sub-regions. The apparatus further includes a plurality of lenses configured to focus incident light onto the image sensor. In some embodiments, a third sub-region of the plurality of sub-regions has a third size, and the third size is different from at least one of the first size or the second size. In some embodiments, the third size is different from both the first size and the second size. In some embodiments, the third sub-region partially overlaps the first sub-region. In some embodiments, the third sub-region partially overlaps the second sub-region. In some embodiments, the second sub-region partially overlaps the first sub-region in a first direction, and the third sub-region partially overlaps the first sub-region in a second direction. In some embodiments, the first direction is perpendicular to the second direction. In some embodiments, each processing unit of the plurality of processing units is configured to generate the processed image for a corresponding sub-region of the plurality of sub-regions by accounting for an overlapped portion of the corresponding sub-region. In some embodiments, each processing unit of the plurality of processing units is configured to account for the overlapped portion by assigning a light reception factor based on an amount an area of the overlapped portion and an area of the corresponding sub-region. In some embodiments, each processing unit of the plurality of processing units is configured to account for the overlapped portion by discarding light received at the overlapped portion.

An aspect of this description relates to an apparatus. The apparatus includes an image sensor having a light sensing region, the light sensing region being partitioned into a plurality of sub-regions, a first sub-region of the plurality of sub-regions is partially overlapped by a second sub-region of the plurality of sub-regions. The apparatus further includes a processor coupled with the image sensor, wherein the processor includes a plurality of pixel processing units, each processing unit of the plurality of processing units is configured to generate a processed image based on an image captured by a corresponding sub-region of the plurality of sub-regions, and a first processing unit of the plurality of processing units is configured to generate the processed image for the first sub-region by accounting for an overlapped portion of the first sub-region. The apparatus further includes a plurality of lenses configured to focus incident light onto the image sensor. In some embodiments, a size of the first sub-region is different from a size of the second sub-region. In some embodiments, the first processing unit is configured to account for the overlapped portion by assigning a light reception factor based on an amount an area of the overlapped portion and an area of the first sub-region. In some embodiments, the first processing unit is configured to account for the overlapped portion by discarding light received at the overlapped portion. In some embodiments, the first processing unit is configured to account for the overlapped portion by comparing light received in the overlapped region with a noise threshold value. In some embodiments, the first processing unit is configured to account for the overlapped portion by considering light received in the overlapped portion in response to the light received in the overlapped portion satisfying the noise threshold value. In some embodiments, the first processing unit is configured to account for the overlapped portion by discarding light received in the overlapped portion in response to the light received in the overlapped portion failing to satisfy the noise threshold value.

An aspect of this application relates to an apparatus. The apparatus an image sensor having a light sensing region, the light sensing region being partitioned into a plurality of sub-regions, a first sub-region of the plurality of sub-regions is partially overlapped by a second sub-region of the plurality of sub-regions. The apparatus further includes a processor coupled with the image sensor, wherein the processor includes a plurality of pixel processing units, each processing unit of the plurality of processing units is configured to generate a processed image based on an image captured by a corresponding sub-region of the plurality of sub-regions, and a first processing unit of the plurality of processing units is configured to generate the processed image for the first sub-region by accounting for an overlapped portion of the first sub-region based on a comparison between the light received in the overlapped portion and a noise threshold value. The apparatus further includes a plurality of lenses configured to focus incident light onto the image sensor. In some embodiments, the first processing unit is configured to consider light received in the overlapped portion in response to the light received in the overlapped portion satisfying the noise threshold value. In some embodiments, the first processing unit is configured to discard light received in the overlapped portion in response to the light received in the overlapped portion failing to satisfy the noise threshold value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus comprising:

an image sensor having a light sensing region, the light sensing region being partitioned into a plurality of sub-regions, a first sub-region of the plurality of sub-regions has a first size, a second sub-region of the plurality of sub-regions has a rectangular shape and a second size different from the first size, and the second sub-region overlaps with the first sub-region along an entire border of the second sub-region;

a processor coupled with the image sensor, wherein the processor comprises a plurality of pixel processing units, each processing unit of the plurality of processing units is configured to generate a processed image based on an image captured by a corresponding sub-region of the plurality of sub-regions, the image captured by the corresponding sub-region includes overlapping areas of adjacent sub-regions of the plurality of sub-regions, and each processing unit of the plurality of processing units is configured to generate the processed image for a corresponding sub-region of the plurality of sub-regions by accounting for an overlapped portion of the corresponding sub-region; and a plurality of lenses configured to focus incident light onto the image sensor.

2. The apparatus of claim 1, wherein a third sub-region of the plurality of sub-regions has a third size, and the third size is different from at least one of the first size or the second size.

3. The apparatus of claim 2, wherein the third size is different from both the first size and the second size.

4. The apparatus of claim 2, wherein the third sub-region partially overlaps the first sub-region.

5. The apparatus of claim 4, wherein the third sub-region partially overlaps the second sub-region.

6. The apparatus of claim 2, wherein the second sub-region partially overlaps the first sub-region in a first direction, and the third sub-region partially overlaps the first sub-region in a second direction.

7. The apparatus of claim 6, wherein the first direction is perpendicular to the second direction.

8. The apparatus of claim 1, wherein each processing unit of the plurality of processing units is configured to account for the overlapped portion by assigning a light reception factor based on an amount an area of the overlapped portion and an area of the corresponding sub-region.

9. The apparatus of claim 1, wherein each processing unit of the plurality of processing units is configured to account for the overlapped portion by discarding light received at the overlapped portion.

10. An apparatus comprising:

an image sensor having a light sensing region, the light sensing region being partitioned into a plurality of sub-regions, a first sub-region of the plurality of sub-regions is overlapped by a second sub-region of the plurality of sub-regions along an entire border of the second sub-region, wherein an overlapped border of the first sub-region of the plurality of sub-regions is in parallel with the entire border of the second sub-region, and the second sub-region has a rectangular shape;

a processor coupled with the image sensor, wherein the processor comprises a plurality of pixel processing units, each processing unit of the plurality of processing units is configured to generate a processed image based on an image captured by a corresponding sub-region of the plurality of sub-regions, and a first processing unit of the plurality of processing units is configured to generate the processed image for the first sub-region by accounting for an overlapped portion of the first sub-region; and a plurality of lenses configured to focus incident light onto the image sensor.

11. The apparatus of claim 10, wherein a size of the first sub-region is different from a size of the second sub-region.

12. The apparatus of claim 10, wherein the first processing unit is configured to account for the overlapped portion by assigning a light reception factor based on an amount an area of the overlapped portion and an area of the first sub-region.

13. The apparatus of claim 10, wherein the first processing unit is configured to account for the overlapped portion by discarding light received at the overlapped portion.

14. The apparatus of claim 10, wherein the first processing unit is configured to account for the overlapped portion by comparing light received in the overlapped portion with a noise threshold value.

15. The apparatus of claim 14, wherein the first processing unit is configured to account for the overlapped portion by considering light received in the overlapped portion in response to the light received in the overlapped portion satisfying the noise threshold value.

16. The apparatus of claim 14, wherein the first processing unit is configured to account for the overlapped portion by discarding light received in the overlapped portion in response to the light received in the overlapped portion failing to satisfy the noise threshold value.

17. An apparatus comprising:

an image sensor having a light sensing region, the light sensing region being partitioned into a plurality of sub-regions, a first sub-region of the plurality of sub-regions is partially overlapped by a second sub-region of the plurality of sub-regions, wherein a width of an overlapped portion of the first sub-region is constant along an entirety of the overlapped portion;

a processor coupled with the image sensor, wherein the processor comprises a plurality of pixel processing units, each processing unit of the plurality of processing units is configured to generate a processed image based on an image captured by a corresponding sub-region of the plurality of sub-regions, and a first processing unit of the plurality of processing units is configured to generate the processed image for the first sub-region by accounting for an overlapped portion of the first sub-region based on a comparison between the light received in the overlapped portion and a noise threshold value; and a plurality of lenses configured to focus incident light onto the image sensor.

18. The apparatus of claim 17, wherein the first processing unit is configured to consider light received in the overlapped portion in response to the light received in the overlapped portion satisfying the noise threshold value.

19. The apparatus of claim 17, wherein the first processing unit is configured to discard light received in the overlapped portion in response to the light received in the overlapped portion failing to satisfy the noise threshold value.

20. The apparatus of claim 17, wherein a size of the first sub-region is different from a size of the second sub-region.

* * * * *